United States Patent
Aida et al.

(10) Patent No.: US 7,402,640 B2
(45) Date of Patent: Jul. 22, 2008

(54) FLUOROPOLYMER AND FILM MADE OF IT

(75) Inventors: Shigeru Aida, Ichihara (JP); Atsushi Funaki, Ichihara (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 11/430,054

(22) Filed: May 9, 2006

(65) Prior Publication Data

US 2006/0205903 A1   Sep. 14, 2006

Related U.S. Application Data

(63) Continuation of application No. PCT/JP04/08352, filed on Jun. 15, 2004.

(30) Foreign Application Priority Data

Nov. 17, 2003  (JP) ............................. 2003-386166

(51) Int. Cl.
   *C08F 16/24* (2006.01)

(52) U.S. Cl. .................. 526/247; 526/242; 526/250; 526/348.1

(58) Field of Classification Search ................. 526/247, 526/242, 250, 348.1
   See application file for complete search history.

(56) References Cited

U.S. PATENT DOCUMENTS

| 4,381,387 A * | 4/1983 | Sulzbach ............ 526/247 |
| 5,264,509 A | 11/1993 | Arcella et al. ............ 526/247 |
| 6,197,904 B1 * | 3/2001 | Gangal et al. ............ 526/247 |
| 2005/0288465 A1 * | 12/2005 | Aida et al. ............ 526/247 |

FOREIGN PATENT DOCUMENTS

| DE | 38 28 575 | 3/1990 |
| EP | 43948 A1 * | 6/1981 |
| EP | 927729 A1 * | 9/1997 |
| JP | 57-38807 | 3/1982 |
| JP | 63-222852 | 9/1988 |
| JP | 2-36240 | 2/1990 |
| JP | 3-188132 | 8/1991 |
| JP | 8-5976 | 1/1996 |
| WO | 98/10000 | 3/1998 |
| WO | WO-98/10000 * | 3/1998 |
| WO | WO 02/28926 A1 | 4/2002 |

OTHER PUBLICATIONS

T. Pieper, et al., "Wide-angle X-ray studies on ethylene-tetrafluoroethylene (ETFE) copolymers", Polymer, 1989, vol. 30, Oct. 1989, pp. 1768-1775.*

Stephen Tanno, "ETFE Foil Cushions as an Alternative to Glass For Atriums and Rooflights", International Conference on Building Envelope Systems and Technology $2^{nd}$., 1997, pp. 357-362.

Architectural Institute of Japan, AIJ Recommendations for Loads on Buildings, pp. 482-483 and 512 (1993).

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, P.C.

(57) ABSTRACT

A fluorocopolymer and film thereof exhibiting excellent transparency and mechanical strength at ambient and elevated temperatures, wherein the fluorocopolymer includes polymerized units based on ethylene (E), tetrafluoroethylene (TFE), hexafluoropropylene (HFP) and perfluoro(alkyl vinyl ether) (PFAV), wherein the molar ratio of polymerized units based on E/TFE is from 10/90 to 60/40, the content of polymerized units based on HFP is from 0.2 to 0.9 mol % based on the total number of polymerized units, and the content of polymerized units based on PFAV is from 0.1 to 1.0 mol % based on the total number of polymerized units.

12 Claims, No Drawings

FLUOROPOLYMER AND FILM MADE OF IT

TECHNICAL FIELD

The present invention relates to a fluorocopolymer and a film made of it.

BACKGROUND ART

A fluororesin film and a film made of a fluororesin composite are light in weight and excellent in weather resistance, mechanical strength, etc. and therefore used as a covering material for e.g. a swimming pool, a gymnasium, a tennis court, a football ground, a warehouse, a hall, an exhibition hall, a horticultural greenhouse or an agricultural greenhouse (for example, JP-A-3-188132, JP-A-63-222852). However, a film made of a composite of glass fibers and a fluororesin as disclosed in JP-A-63-222852 is insufficient in transparency. Accordingly, if the film is used as a covering material for the roof of a structure, the sunbeam transmittance of the roof tends to be low. Thus, plants in the interior of the structure will not sufficiently grow. Accordingly, the above film made of the composite can not be applicable as a covering material for horticultural facilities or sports facilities in which grass grows. Further, the interior of an architectural structure will be insufficient in wide open feeling. Here, an architectural structure wherein a membrane material is used for the roof or the outer wall will be referred to as a membrane structure. Further, a film which is fixed to a framework of e.g. iron or wood to form the roof or the outer wall portion of a structure will be referred to as a film for a membrane structure.

An ethylene/tetrafluoroethylene copolymer (hereinafter referred to as ETFE) film is excellent in the sunbeam transmittance and is thereby used as a film for a membrane structure suitable for e.g. an agricultural greenhouse, a horticultural greenhouse (see JP-B-08-5976), sport facilities in which grass grows and an exhibition hall. International Conference on Building Envelope Systems and Technology 2nd., Setphen Tanno et al., 1997 proposes a roof obtained in such a manner that a plurality of films for a membrane structure overlaid one on another are sandwiched between an iron frame to form a panel, and air is put between the films to blow the panel up. Such a film for a membrane structure is required to have mechanical strength such as tensile strength and tear strength as well as weather resistance and transparency. Further, the film for a membrane structure is exposed to direct sunlight in summer (Architectural Institute of Japan, AIJ Recommendations for Loads on Buildings) and thus it is required to maintain excellent mechanical strength even at a high temperature of about 60° C.

As an ETFE excellent in mechanical strength, a tetrapolymer ETFE obtained by copolymerization of from 40 to 60 mol % of ethylene (hereinafter referred to as E), from 30 to 55 mol % of tetrafluoroethylene (hereinafter referred to as TFE), from 1.5 to 10 mol % of hexafluoropropylene (hereinafter referred to as HFP) and from 0.05 to 2.5 mol % of a comonomer as a fourth component has been proposed. It is excellent in mechanical strength as compared with a terpolymer ETFE having no fourth component comonomer copolymerized (JP-A-57-38807). However, for a film for a membrane structure, more excellent mechanical strength and transparency are required. A tetrapolymer ETFE excellent in transparency and tear strength has been proposed (WO98/10000), but its mechanical strength has been significantly dependent on temperature, and its mechanical strength at high temperature is not necessarily sufficient.

DISCLOSURE OF THE INVENTION

Object to be Accomplished By the Invention

It is an object of the present invention to provide a fluorocopolymer excellent in transparency and excellent in mechanical strength at room temperature and at high temperature, and a film made of it, development of which has been required under the above circumstances.

Means to Accomplish the Object

The present invention provides a fluorocopolymer comprising polymerized units based on E, polymerized units based on TFE, polymerized units based on HFP and polymerized units based on a perfluoro(alkyl vinyl ether), characterized in that the molar ratio of polymerized units based on E/polymerized units based on TFE is from 10/90 to 60/40, the content of the polymerized units based on HFP is from 0.1 to 1.0 mol % based on the total polymerized units, and the content of the polymerized units based on a perfluoro(alkyl vinyl ether) is from 0.1 to 1.0 mol % based on the total polymerized units.

The present invention further provides a film obtained by forming the above fluorocopolymer.

Effects of the Invention

The fluoropolymer and a film made of it of the present invention are excellent in weather resistance and transparency and excellent in mechanical strength at room temperature and at high temperature.

BEST MODE FOR CARRYING OUT THE INVENTION

The fluorocopolymer of the present invention comprises polymerized units based on E, polymerized units based on TFE, polymerized units based on HFP and polymerized units based on a perfluoro(alkyl vinyl ether) (hereinafter referred to as PFAV).

The molar ratio of polymerized units based on E/polymerized units based on TFE is from 10/90 to 60/40, preferably from 35/65 to 55/45, more preferably from 35/65 to 50/50. When the molar ratio is within the above range, the fluorocopolymer will be excellent in chemical resistance, weather resistance and tensile strength at high temperature (60° C.).

The content of the polymerized units based on HFP is from 0.1 to 1.0 mol % based on the total polymerized units, preferably from 0.2 to 0.9 mol %, more preferably from 0.3 to 0.8 mol %. If the content of the polymerized units based on HFP is lower than the above range, the Elmendorf tear strength of the fluorocopolymer will be insufficient, and if the content is higher than the above range, the tensile strength at room temperature and at high temperature (60° C.) will be insufficient. When the content is within the above range, the fluorocopolymer will be excellent in mechanical strength such as tear strength and tensile strength at room temperature and at high temperature.

The content of the polymerized units based on PFAV is from 0.1 to 1.0 mol % based on the total polymerized units. It is preferably from 0.2 to 0.9 mol %, more preferably from 0.3 to 0.8 mol %. If it is lower than the above range, the transparency will be insufficient, and if it is larger than the above range, the tensile strength at room temperature and at high temperature (60° C.) will be insufficient. When the content is within the above range, the fluorocopolymer will be excellent in transparency and mechanical strength such as tensile strength at room temperature and at high temperature.

PFAV in the present invention is preferably a compound represented by the formula $CF_2=CFOR^f$ (wherein $R^f$ is a $C_{1-10}$ perfluoroalkyl group). $R^f$ has preferably from 2 to 6, more preferably from 2 to 4 carbon atoms. Specifically, it is more preferably $CF_2=CFOCF_2CF_3$, $CF_2=CFOCF_2CF_2CF_3$, $CF_2=CFOCF(CF_3)_2$, $CF_2=CFOCF_2CF_2CF_2CF_3$, $CF_2=CFOCF(CF_3)CF_2CF_3$ or $CF_2=CFOCF_2CF(CF_3)_2$, most preferably $CF_2=CFOCF_2CF_2CF_3$.

It is preferred that in the fluorocopolymer of the present invention, the molar ratio of polymerized units based on E/polymerized units based on TFE is from 35/65 to 55/45, the content of the polymerized units based on HFP is from 0.2 to 0.9 mol % based on the total polymerized units, and the content of the polymerized units based on PFAV is from 0.2 to 0.9 mol % based on the total polymerized units. It is particularly preferred that the molar ratio of polymerized units based on E/polymerized units based on TFE is from 35/65 to 50/50, the content of the polymerized units based on HFP is from 0.3 to 0.8 mol % based on the total polymerized units, and the content of the polymerized units based on PFAV is from 0.3 to 0.8 mol % based on the total polymerized units.

The fluorocopolymer of the present invention, which has the above specific composition, is excellent in tear strength, and tensile strength at room temperature and at high temperature, and is excellent also in transparency. This is unexpected from the finding such that in ETFE having as a third component HFP or PFAV copolymerized, when the proportion of HFP or PFAV copolymerized is increased, the crystallinity of ETFE tends to decrease and its transparency will be high, but the tear strength and the tensile strength tend to decrease (JP-A-63-222852).

A method for producing the fluorocopolymer of the present invention may, for example, be suspension polymerization, solution polymerization, emulsion polymerization or bulk polymerization. Radical polymerization is preferred, and more preferred is solution polymerization wherein monomers are polymerized in the presence of a radical polymerization initiator, a chain transfer agent and a polymerization medium.

The radical polymerization initiator is preferably an initiator of which the temperature at which the half life is 10 hours is from 0 to 100° C., more preferably from 20 to 90° C. Specifically, it may, for example, be an azo compound such as azobisisobutyronitrile, a peroxydicarbonate such as diisopropyl peroxydicarbonate, a peroxyester such as tert-butyl peroxypivalate, tert-butyl peroxyisobutyrate or tert-butyl peroxyacetate, a non-fluorinated diacyl peroxide such as isobutyryl peroxide, octanoyl peroxide, benzoyl peroxide or lauroyl peroxide, a fluorinated diacyl peroxide such as $(Z(CF_2)_pCOO)_2$ (wherein Z is a hydrogen atom, a fluorine atom or a chlorine atom, and p is an integer of from 1 to 10), or an inorganic peroxide such as potassium persulfate, sodium persulfate or ammonium persulfate.

The polymerization medium may, for example, be an organic solvent such as a fluorohydrocarbon, a chlorohydrocarbon, a chlorofluorohydrocarbon, an alcohol or a hydrocarbon, or an aqueous medium. The chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, or a hydrocarbon such as pentane, hexane or cyclohexane. The polymerization conditions are not particularly limited. The polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours, more preferably from 2 to 10 hours.

As a method for producing a film made of the fluorocopolymer, preferred is a method of discharging the molten fluorocopolymer from a T-die by means of an extruder and winding it on a roll. As the extrusion condition, the die temperature is preferably from 250 to 350° C.

Further, the film obtained by forming the fluorocopolymer of the present invention preferably has a haze which is an index of transparency of at most 15%, a tensile strength of at least 50 MPa and an Elmendorf tear strength of at least 38 N. The Elmendorf tear strength is more preferably at least 40 N. The tensile strength is more preferably at least 55 MPa. The haze is more preferably at most 13%. When the Elmendorf tear strength and the tensile strength are within the above ranges, the film is less likely to be torn or broken, even when an external force due to a flying object, strong wind or snow fallen on the film is applied thereto. Further, when the haze is within the above range, the growth of plants in the interior will not be inhibited. Further, a wide open feeling as if a person is outside can be produced.

The tensile strength of the film at high temperature (60° C.) is preferably at least 40 MPa, more preferably at least 45 MPa. When the tensile strength is within the above range, the film is less likely to be broken even when an external force is applied thereto at high temperature in summer.

Preferably, the film obtained by forming the fluorocopolymer of the present invention is a film for a membrane structure or an agricultural covering material.

EXAMPLES

Now, the present invention will be explained in further detail with reference to Examples. However, the present invention is by no means restricted thereto. Physical properties described in Examples were measured by the following methods.

Composition of Fluorocopolymer

It was obtained by means of $^{19}$F-NMR and fluorine mass spectrometric analysis of a fluorocopolymer in a molten state.

Melting Point (° C.)

It was obtained by an endothermic peak obtained when a fluorocopolymer was heated to 300° C. at 10° C./min using a scanning differential thermal analyzer (DSC220CU manufactured by Seiko Instruments Inc.).

Volumetric Flow Rate (mm$^3$/Sec)

It is represented by the extrusion rate when a fluorocopolymer is extruded from an orifice with a diameter of 2.1 mm and a length of 8 mm under a load of 7 kg at a temperature of 297° C. by using a Flowtester manufactured by Shimadzu Corporation.

Haze (%)

A fluorocopolymer was pressed at 300° C. and formed into a film having a thickness of 200 μm, and the haze was measured by using SM-5 manufactured by SUGA TEST INSTRUMENTS, Co., Ltd. in accordance with a method as disclosed in JIS K7105.

Elmendorf Tear Strength (N)

A fluorocopolymer was pressed at 300° C. and formed into a film having a thickness of 100 μm, and a rectangular test specimen as disclosed in JIS K7128-2 was cut out from the film. With respect to the obtained test specimen, the tear strength was measured by using an Elmendorf type Tearing Tester (manufactured by Toyo Seiki Seisaku-sho, Ltd.).

Tensile Strength (MPa)

A fluorocopolymer was pressed at 300° C. and formed into a sheet having a thickness of 1.5 mm, and a 5B test specimen as disclosed in JIS K7162 was cut out from the sheet. With respect to the obtained test specimen, a tensile test was carried out at a rate of 200 mm/min at room temperature by using a tensile tester (manufactured by ORIENTEC Co., Ltd.) to measure the tensile strength at break.

Tensile Strength at High Temperature (MPa)

The above tensile test was carried out at 60° C. to measure the tensile strength at break, which was employed as the tensile strength at high temperature.

EXAMPLE 1

A polymerization reactor equipped with a stirrer having an internal volume of 94 L was deaerated, and 70.6 kg of 1-hydrotridecafluorohexane, 20.4 kg of 1,3-dichloro-1,1,2,2,3-pentafluoropropane (manufactured by Asahi Glass Company, Limited, hereinafter referred to as AK225cb), 1.62 kg of perfluoro(propyl vinyl ether) (hereinafter referred to as PPVE) and 2.25 kg of HFP were charged. The temperature in the interior of the polymerization reactor was increased to 66° C., a mixed gas of TFE/E=76/24 (molar ratio) was injected until the pressure reached 1.5 MPa-G, and 65 mL of a 1 mass % AK225cb solution of tert-butyl peroxypivalate as a polymerization initiator was charged to initiate the polymerization. Since the pressure decreased along with the progress of the polymerization, a monomer mixed gas of TFE/E=50/50 (molar ratio) was continuously charged so that the pressure would be kept at 1.5 MPa-G during the polymerization. 7.3 hours after initiation of the polymerization, when 7.1 kg of the monomer mixed gas was charged, the temperature in the interior of the polymerization reactor was decreased to room temperature and at the same time, unreacted monomers were purged until the pressure reached normal pressure.

The obtained fluorocopolymer 1 in the form of a slurry was put into a 200 L granulation tank into which 75 kg of water was charged, followed by heating to 105° C. with stirring for granulation while the solvent was distilled off. The obtained granules were dried at 150° C. for 5 hours to obtain 7.4 kg of fluorocopolymer granules 1, which were pelletized in an extruder to obtain pellets 1.

As a result of molten NMR analysis and fluorine content analysis, the composition of the fluorocopolymer 1 was such that polymerized units based on TFE/polymerized units based on E/polymerized units based on HFP/polymerized units based on PPVE=50.6/48.2/0.7/0.6 (mol %). The melting point was 269° C., and the volumetric flow rate was 5.8 mm$^3$/sec. The haze was 10.8%, the Elmendorf tear strength was 40 N, the tensile strength was 56.2 MPa, and the tensile strength at high temperature was 43.7 MPa.

EXAMPLE 2

The polymerization reaction was carried out in the same manner as in Example 1 except that 1.08 kg of PPVE and 1.61 kg of HFP were charged initially, to obtain a fluorocopolymer 2 and fluorocopolymer granules 2. The fluorocopolymer granules 2 were pelletized in an extruder to obtain pellets 2.

As a result of molten NMR analysis and fluorine content analysis, the composition of the fluorocopolymer 2 was such that polymerized units based on TFE/polymerized units based on E/polymerized units based on HFP/polymerized units based on PPVE=50.3/48.8/0.5/0.4 (mol %). The melting point was 273° C., the volumetric flow rate was 5.2 mm$^3$/sec, the haze was 12.5%, the Elmendorf tear strength was 44 N, the tensile strength was 58.5 MPa, and the tensile strength at high temperature was 49.2 MPa.

COMPARATIVE EXAMPLE 1

The polymerization reaction was carried out in the same manner as in Example 1 except that 4.83 kg of HFP was charged, to obtain a fluorocopolymer 3 and fluorocopolymer granules 3. The fluorocopolymer granules 3 were pelletized in an extruder to obtain pellets 3.

As a result of molten NMR analysis and fluorine content analysis, the composition of the fluorocopolymer 3 was such that polymerized units based on TFE/polymerized units based on E/polymerized units based on HFP/polymerized units based on PPVE=49.6/48.3/1.5/0.7 (mol %). The melting point was 261° C., the volumetric flow rate was 6.5 mm$^3$/sec, the haze was 9.3%, the Elmendorf tear strength was 35 N, the tensile strength was 47.6 MPa, and the tensile strength at high temperature was 36.8 MPa.

COMPARATIVE EXAMPLE 2

The polymerization reaction was carried out in the same manner as in Example 1 except that no HFP was charged and 2.16 kg of PPVE was charged, to obtain a fluorocopolymer 4 and fluorocopolymer granules 4. The fluorocopolymer granules 4 were pelletized in an extruder to obtain pellets 4.

As a result of molten NMR analysis and fluorine content analysis, the composition of the fluorocopolymer 4 was such that polymerized units based on TFE/polymerized units based on E/polymerized units based on PPVE=50.7/48.5/0.8 (mol %). The melting point was 272° C., the volumetric flow rate was 6.1 mm$^3$/sec, the haze was 8.9%, the Elmendorf tear strength was 34 N, the tensile strength was 53.3 MPa, and the tensile strength at high temperature was 45.6 MPa.

COMPARATIVE EXAMPLE 3

The polymerization reaction was carried out in the same manner as in Example 1 except that no PPVE was charged and 2.57 kg of HFP was charged, to obtain a fluorocopolymer 5 and fluorocopolymer granules 5. The fluorocopolymer granules 5 were pelletized in an extruder to obtain pellets 5.

As a result of molten NMR analysis and fluorine content analysis, the composition of the fluorocopolymer 5 was such that polymerized units based on TFE/polymerized units based on E/polymerized units based on HFP=50.7/48.5/0.8 (mol %) The melting point was 275° C., the volumetric flow rate was 8.5 mm$^3$/sec, the haze was 35.2%, the Elmendorf tear strength was 48 N, the tensile strength was 43.8 MPa, and the tensile strength at high temperature was 41.8 MPa.

INDUSTRIAL APPLICABILITY

A film made of the fluorocopolymer of the present invention is useful as e.g. a highly transparent film to be used for e.g. an agricultural covering material such as a film for agricultural greenhouses, a film for a membrane structure to be used for e.g. the roof or the outer wall of sports facilities and exhibition halls, a protective film for solar cells, a film for solar collectors, and a cover film for solar water heaters.

The entire disclosure of Japanese Patent Application No. 2003-386166 filed on Nov. 17, 2003 including specification, claims, and summary is incorporated herein by reference in its entirety.

What is claimed is:

1. A fluorocopolymer comprising polymerized units based on ethylene, polymerized units based on tetrafluoroethylene, polymerized units based on hexafluoropropylene and polymerized units based on a perfluoro(alkyl vinyl ether), characterized in that the molar ratio of polymerized units based on ethylene/polymerized units based on tetrafluoroethylene is from 10/90 to 60/40, the content of the polymerized units based on hexafluoropropylene is from 0.3 to 0.8 mol % based on the total polymerized units, and the content of the polymerized units based on a perfluoro(alkyl vinyl ether) is from 0.1 to 1.0 mol % based on the total polymerized units.

2. The fluorocopolymer according to claim 1, wherein the molar ratio of polymerized units based on ethylene/polymerized units based on tetrafluoroethylene is from 35/65 to 55/45, and the content of the polymerized units based on a perfluoro(alkyl vinyl ether) is from 0.2 to 0.9 mol % based on the total polymerized units.

3. The fluorocopolymer according to claim 1, wherein the molar ratio of polymerized units based on ethylene/polymerized units based on tetrafluoroethylene is from 35/65 to 50/50, and the content of the polymerized units based on a perfluoro(alkyl vinyl ether) is from 0.3 to 0.8 mol % based on the total polymerized units.

4. A film obtained by forming the fluorocopolymer as defined in claim 1.

5. The film according to claim 4, which has an Elmendorf tear strength of at least 38 N, a haze of at most 15% and a tensile strength of at least 50 MPa.

6. The film according to claim 4, which has an Elmendorf tear strength of at least 40 N, a haze of at most 13% and a tensile strength of at least 55 MPa.

7. The film according to claim 4, which has a tensile strength at high temperature (60° C.) of at least 40 MPa.

8. The film according to claim 4, which has a tensile strength at high temperature (60° C.) of at least 45 MPa.

9. The film according to claim 4, which is a film for a membrane structure.

10. The film according to claim 4, which is an agricultural covering material.

11. The fluorocopolymer according to claim 1, wherein the fluorocopolymer has an Elmendorf tear strength of at least 38 N, a tensile strength at room temperature of at least 50 MPa, a tensile strength at 60° C. of at least 40 MPa, and a haze of at most 15%.

12. The fluorocopolymer according to claim 1, wherein the fluorocopolymer has an Elmendorf tear strength of at least 40 N, a tensile strength at room temperature of at least 55 MPa, a tensile strength at 60° C. of at least 45 MPa, and a haze of at most 13%.

* * * * *